May 2, 1961  J. R. McKEE, JR  2,982,573

COMPOSITE SEALING WASHER

Filed Dec. 12, 1958

INVENTOR.

John R. McKee, Jr.

BY Christy, Parmelee & Strickland

ATTORNEYS.

United States Patent Office 2,982,573
Patented May 2, 1961

2,982,573
COMPOSITE SEALING WASHER
John R. McKee, Jr., 1900 Murdstone Drive,
Pittsburgh 34, Pa.
Filed Dec. 12, 1958, Ser. No. 780,130
3 Claims. (Cl. 288—26)

This invention relates to composite sealing washers for use with threaded fasteners and has for its object to provide a full seal over the area of the washer and about the fastener shank and threads upon which the washer is mounted.

The washer of the invention is particularly adapted for sealing about fasteners securing together members which are subjected to hydrostatic pressures but has advantageous application in other situations requiring a sealing washer. Industry generally makes use of many designs of manufacture comprising overlapping members which are secured together by a threaded fastener which is inserted through pre-formed openings in the members and the washer is necessary to provide a seal about said member openings.

Sealing washers for these general purposes are known in the art, and although somewhat successful when dealing with atmospheric pressures they have become quite complicated and require expensive construction when dealing with pressures above atmospheric from fluids and gases. In the present invention a deformable washer backing member is combined with a resilient deformable washer sealing member to obtain improved sealing without excess costs in preparing and perforating the members to be sealed at their areas of connection by a threaded fastener passing through the members. The use of the washer of the invention with so-called knock-down constructions which may be assembled with threaded fasteners for use at one place and taken down for erection at another, results in sealing of the fastener openings comparable with permanent unitary structures erected without perforations for fasteners. The washer of the invention is equally applicable to threaded and non-threaded fasteners used in assembling permanent and knock-down structures.

The washer of the invention may be economically manufactured from laminated sheet material comprised of a deformable metal sheet having a layer of compressible or flowable sealing material secured to one face thereof by any suitable adhesive preventing displacement or separation of the metal sheet and the sealing material during manufacture or assembly with the fastener. The superior sealing obtained by use of these washers results from the confinement of the flowable sealing material by the deformable backing member. The sealing material may be of rubber, either natural or synthetic, or other suitable material having sufficient flowability for the intended use. The metal sheet may advantageously be formed of steel or other materials which have similar deforming characteristics suitable for the intended purpose. For purposes of illustrating a preferred form of the invention a layer of neoprene rubber is laminated by use of an adhesive, heat and pressure to a steel sheet. Which sheet is preferably galvanized.

Referring now to the drawings.

Referring now in detail to the drawings, it is customary in the construction of bolted plate assemblies to form openings in the plates slightly larger in diameter than the outside diameter of the standard bolt shank to be received therein. Consequently, in conventional fabricated practice, when the overlapped plates are connected together by a bolt, the bolt shank does not completely fill the opening in the plate receiving the bolt shank. The metal backing member of the composite washer, like the plate, has an opening therein larger than the bolt shank received therein. If the bolted plates are assembled into a tank, hydrostatic pressure within the tank causes the fluid or gas in the tank to escape through the clearance between the bolt shank and plate openings and to flow along the threads of said bolt. In other structures, ambient temperature changes on opposite sides of the bolted plates cause "breathing" or movement of moisture laden air through such clearances.

Figure 1:
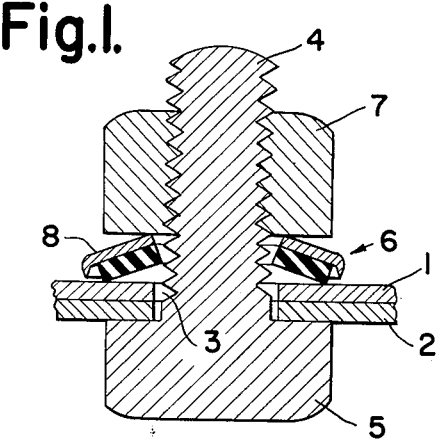
Fig. 1 shows the washer mounted on a bolt with the nut initially engaging the washer.

The rubber or other sealing material, on the inner face of the washer preferably has an opening equal to or larger than the bolt shank to permit ready assembly in the field of the washer upon the bolt shank of Fig. 1. Should the opening in the sealing material be smaller than that of the bolt shank, the entering bolt shank tends to deflect the sealing material into the opening of the metal backing member of the washer and impedes assembly of the washer thereon. If the opening in the sealing member is equal to or only slightly smaller than the bolt shank, a slight twisting of the washer during assembly causes sufficient radial expansion of the material of the sealing member for the shank to readily enter the opening. The cup shaped composite sealing washer of the invention utilizes these characteristics of conventional bolted construction to provide an improved sealing washer by a novel method of controlling flow of the sealing material as the bolted connection is tightened.

Figure 4:
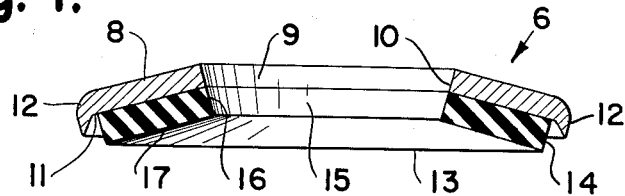
Fig. 4 shows a detail section through the washer on line IV—IV of Fig. 3.

Referring now to Fig. 1 of the drawing, the overlapped plates 1 and 2 have registering openings 3 therein for reception of a threaded bolt shank 4 with the bolt head 5 engaging plate 2 and the shank extending above plate 1 for reception of the composite sealing washer 6 and a nut 7. The composite sealing washer 6, as shown in Fig. 4, is provided with a deformable backing member, preferably of metal. This member is generally referred to as being cupped or convex, in that the faces 8 thereof diverge outwardly and downwardly from the opening 9 therein. The sides 10 of the opening are preferably of substantially right angles to the said faces 8. Thus the bottom of opening 9 at the faces 11 of the backing member freely passes the bolt shank 4 and the top of the opening at the faces 8 is larger in diameter. Consequently, the washer when flattened does not bind on shank 4 and this deforming action serves to improve the seal as hereinafter discussed. The faces 8 and 11 of the backing member are defined at their outer peripheries by a flange 12. This flange is preferably tapered and depends below the faces 11 a distance less than the thickness of the sealing member. The sealing member 13 generally conforms in shape to the backing member and is adhered thereto at faces 11. The outer periphery 14 of the sealing member preferably is disposed in spaced relation to flange 12. An opening 15 extends through the member 13 concentric with the opening 9 of the backing member. The sides 16 of opening 15 are preferably substantially perpendicular to the face 11 of the backing member, with base of the opening 15 at the face 17 of the sealing member being substantially equal to the outside diameter of the bolt 4. The top of openings 15 is consequently larger than at the bottom of opening 15 in relation to the entering bolt shank 4.

Figure 2:
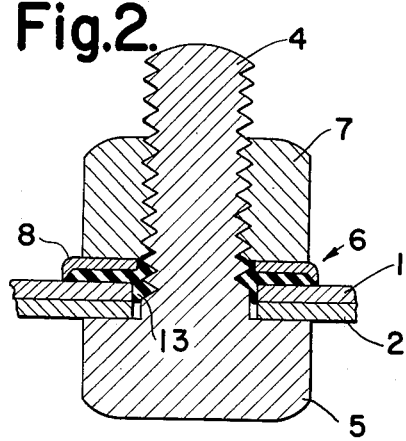
Fig. 2 shows the washer of Fig. 1 deformed into sealing position under pressure from the nut.
Figure 3:
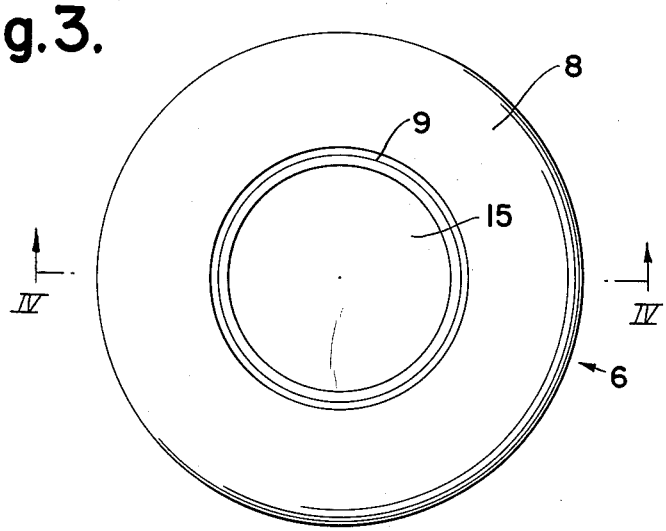
Fig. 3 shows a detail plan view of the washer.

The washer 6 of Fig. 4 is first assembled on the bolt shank 4 as shown in Fig. 1. As the nut 7 is tightened against the washer 6, it flattens into a shape as shown in Fig. 2. During this flattening movement the opening 9 in the face 8 of the backing member assumes a new position relative to the axis of the bolt shank 4 as the face 8 is brought into substantial parallel relation to the sheet 1. As shown in Fig. 4 the minimum diameter of the opening 9 in the metal backing member is larger than the diameter of the entering bolt shank 4. The diameter of the opening 9 through the flattened backing member in relation to the shank 4 is now larger at the inner face of the backing member than initially. During initial compression of the washer 6, between bolt 7 and plate 1, deforming action induces the sealing member to flow inwardly of the backing member around the bolt shank and reduces the tendency of flow laterally outward towards the adjacent outer peripheral face of the backing member.

The cup shape of the washer causes the outer peripheral flange of the backing member to engage the adjacent plate 1 before the portion of the sealing member adjacent the bolt shank engages the said adjacent plate. Thus the outer peripheral flange of the backing member further restricts lateral outward flow of the sealing member and induces inward flow towards the bolt shank. Initially, this flow is upwardly of the bolt shank and into the root openings between the threads. The tapering flange, having its outer portion thinner than its base portion, tends to deflect or slide outwardly in contact with the adjacent plate as the backing member begins to flatten under compression from the nut. During this flattening of the backing member the sealing member, being laterally restricted in flow by the periphery of the backing member and the bolt shank, flows in the direction of least resistance which is vertically downward and upward about the bolt shank. Thus as the backing member assumes a position substantially parallel with the adjacent face of the plate, the backing member is spaced from the plate by the sealing member and the clearance spaces about the bolt shank in the plates and the backing member tends to be filled with the sealing member forming a tight seal preventing escape of fluid under hydrostatic pressure, or escape of gas around the shank due to changes in ambient temperature.

The details of construction of the washer, other than those defined above, may vary to suit conditions. I have found that an angle of divergence between 10 and 20° for the backing member faces 8 gives excellent results. Likewise in the sealing member of the washer, neoprene rubber $\frac{1}{16}$ to $\frac{3}{32}$ thick and of a durometer of 75±10 Shore A hardness gives excellent results. The backing member when made of steel of 16 gauge has good deforming properties. These latter details may be varied, as by substitution of other substantially rigid deformable materials for the backing member and other flowable materials for the neoprene sealing member.

I claim:

1. A composite sealing washer for threaded fasteners comprising an initially convex substantially rigid plate-like backing member having a depending flange defining the periphery thereof and at substantially right angles thereto, said convex plate-like member being deformable into a flat plate-like member under pressure applied axially of the associated fastener, a sealing member of flexible material adhered to the concave inner face of said backing member and conforming to the shape thereof with the periphery of the sealing member disposed in inward spaced relation to the adjacent flanges of the backing member, said sealing member projecting below said backing member flanges when the backing member is convex and deflectable within said flanges as the backing member is flattened, said backing member and sealing member having a central passageway therethrough converging from the convex outer face of the backing member to the concave inner face of the sealing member for reception of the shank of a fastening member, the said passageway at the inner face of the sealing member being of a size to freely receive the fastener shank passing therethrough, said passageway in the convex outer face of the backing member being of such size as to not bind upon the fastener shank as the backing member is deformed into a flat plate-like member.

2. The composite washer as defined in claim 1 wherein the sealing member is of rubber-like material.

3. The sealing washer as defined in claim 1, wherein the inner faces of said body portion flange are inclined outwardly providing a reduced thickness of metal at the outer free ends of said flange.

References Cited in the file of this patent

UNITED STATES PATENTS

| | | |
|---|---|---|
| 2,704,676 | Harding | Mar. 22, 1955 |
| 2,761,347 | McKee | Sept. 4, 1956 |
| 2,772,903 | Susseabach | Dec. 4, 1956 |
| 2,884,100 | McKee | Apr. 28, 1959 |

FOREIGN PATENTS

| | | |
|---|---|---|
| 849,343 | France | Nov. 21, 1938 |